Nov. 12, 1940.   J. B. KESSEL ET AL   2,221,520
APPARATUS FOR MANUFACTURING CARBON DIOXIDE
Filed Feb. 16, 1938
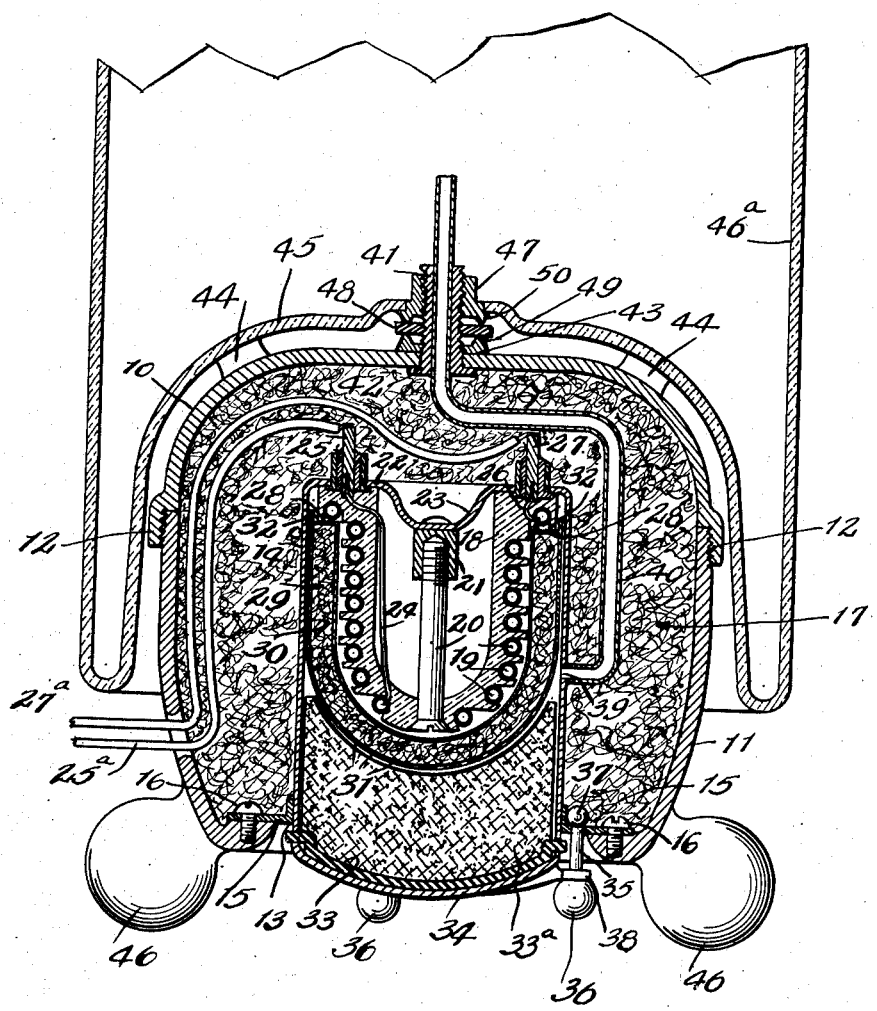
Inventors:
Johannes B Kessel.
Fritz Lessing.
By
Atty Patented Nov. 12, 1940

2,221,520

UNITED STATES PATENT OFFICE 2,221,520

APPARATUS FOR MANUFACTURING CARBON DIOXIDE

Johannes B. Kessel and Fritz Lessing, Chicago, Ill., assignors, by direct and mesne assignments, of one-sixth to Johannes B. Kessel, one-third to Louis Hoffberg, one-sixth to Lawrence A. Jacobson, and one-third to Frieda Lessing, all of Chicago, Ill.

Application February 16, 1938, Serial No. 190,722

7 Claims. (Cl. 23—281)

The invention relates in general to the manufacture of carbonated liquids and one of the objects of the same is to simplify and reduce the cost of production of carbon dioxide on the place of consumption, by thermal decomposition.

Heretofore carbon dioxide ($CO_2$) has been produced in pure form from chemicals and in a simple manner. There are principally two ways of achieving this end, namely by chemical decomposition, such as the reaction of sodium carbonate ($Na_2CO_3$) and hydrochloric acid (HCl), and by thermal decomposition of such as sodium bicarbonate ($NaHCO_3$) or oxalic acid (($CO_2H)_2$).

So far, however, these known reactions have never been commercialy used to prepare and employ carbon dioxide ($CO_2$). Since the transport of highly compressed carbon dioxide gas, or of the liquid or solid carbon dioxide material in many instances is difficult, it is one of the objects of the present invention to overcome these difficulties and objections, and to provide an improved method of and apparatus for producing carbon dioxide from chemicals by thermal decomposition on the place of consumption.

In our co-pending application, Serial Number 180,092 filed December 16, 1937, there is described and claimed a process whereby carbon dioxide and carbon monoxide are produced simultaneously from oxalic acid (($CO_2H)_2$) by thermal decomposition, and the carbon monoxide gas thus developed is later oxidized. In the present invention there is disclosed a new and improved method of producing carbon dioxide, especially useful with chemicals which, when heated decompose to carbon dioxide ($CO_2$), possibly water vapor and a solid residue remaining in the heating chamber.

In this improved method all of the carbonates may be employed for this purpose, but we preferably employ sodium bicarbonate ($NaHCO_3$) for the reason that it is not only inexpensive but it will decompose very readily and at comparatively low temperature (about 270° C.) to carbon dioxide ($CO_2$), water vapor ($H_2O$) and sodium carbonate ($Na_2CO_3$), which can be used as such.

The carbon dioxide gas resulting from the thermal decomposition may be employed for the preparation or production of carbonated liquids in individual homes or in drug stores and other places, or after drying, for creating pressure.

The drying may be readily accomplished in any suitable manner, such for instance by use of a drying agent such as rock wool, or calcium chloride ($CaCl_2$).

The material is preferably molded or shaped into tablets for convenience and to facilitate handling thereof, but if desired it may be used in a loose or powdered form.

The tablet, or the powdered material, if the latter is used, is placed in a suitable heater, such for instance as a heater shown in the accompanying drawing.

In the drawing the figure is a sectional view of one form of heater by means of which this improved method may be carried into operation.

The apparatus consists essentially of an outer casing preferably comprising two sections 10 and 11 which are connected together so that they may be separated, in any desired or suitable manner such as by means of threads 12. The section 11 is provided with an opening 13 in one end thereof into which a chamber 14 projects.

This chamber may be of any desired size and configuration and is held in position preferably by means of a flange 15 contacting the wall of the opening 13, and fastening devices 16 such as screws, may be provided for securing these parts together.

The chamber 14 is preferably of a diameter considerably less than the internal diameter of the casing and terminates short of the wall of the casing, heat insulating material 17 being provided between the wall of the chamber and the casing wall.

Within the chamber 14 is arranged a heating element carrier 18 of any desired refractory material and configuration preferably of a hollow inverted U-shaped configuration and encompassing the carrier 18 and disposed in peripheral grooves is arranged a heating element 19. The elements 18 and 19 are preferably removably secured within the chamber 14 by means of a fastening bolt or screw 20 threaded through the top of the element 18 and engaging threads in a socket 21. The socket 21 is supported by the bottom 22 of the chamber and if desired the central portion 23 of the bottom may be convexed.

A conductor 24 is secured to the element 19 and also to a contact terminal 25 while another conductor 26 is also secured to the element 19 and to a contact terminal 27. These contact terminals 25—27 may be connected to any suitable source of supply of electric current, such as by means of extension conductors 25a and 27a secured to the terminals 25—27 leading through the casing wall and terminating in a socket plug (not shown).

The element 18 is of a height considerably less than the height of the chamber 14 and is of an external diameter also considerably less than the internal diameter of the chamber, the bottom of the element being preferably offset so as to form a circumferential shoulder 28.

The material 29 to be treated, which may be sodium bicarbonate or any other inorganic carbonate is supplied either in a compressed form or in a powdered form, but is preferably of a compacted form of a configuration to conform to the configuration of the element 18.

The material is preferably arranged within a casing or envelope 30 of a suitable and preferably thin material, and the casing wall is provided with any suitable number of openings 31 through which the vapor or gas generated may escape.

When the casing 30 is in position its ends preferably rest upon the shoulder 28 of the element 18 and if desired a flange 32 may be provided to overhang the edge of the base of the element 18 and to assist in holding the casing 30 in position.

Within the chamber 14 and above the casing 30 there may be arranged suitable insulating material 33a, and a gasket or packing 33 may be provided between the open end of the chamber 14 and a closure 34 for the chamber. This closure 34 may be held in position in any suitable manner, such as by means of fastening elements 35 being provided with heads 36—37 at its ends, the head 37 engaging under the flange 15 while the element 35 passes through the flange. The element 35 is also adapted to enter a bifurcation 38 in a projection carried by the closure.

Any number of these fastening devices may be employed. The wall of the chamber 14 is provided with a discharge outlet 39 suitably located, and connected with the opening is a discharge pipe 40 the free end of which communicates with a tubular member 41 seated in and extending through the wall of one of the sections of the outer casing. This element may be secured in position in any suitable manner preferably by means of a flange 42 thereon resting against the inner face of the section 10 and a nut 43 threaded on to the element and abutting the other side or face of the element 10.

If desired, suitable feet or projections 44 may be provided on the section 10 to hold it spaced from a wall of a container 45, and additional feet 46 at the other end of the outer casing may be provided for supporting the structure upon any suitable support.

In use when the material 29 is placed in position and the chamber 14 sealed, the heat generated by the heating element 19 acts upon the material 29 to decompose the same, thereby generating a gas or vapor which will escape from the casing 30 through the openings 31 into the chamber 14. From there it will pass through the outlet 39 and pipe 40 to be discharged through the tubular member 41.

With this construction it will be manifest that the material 29 may be readily removed and replaced by removing the closure 34, packing 33 and insulating material 33a.

While the preferred form of the apparatus is herein shown and described it is to be understood that various changes may be made in the details of construction and in the combination and arrangement of the several parts, within the scope of the claims, without departing from the spirit of this invention.

In the drawings the apparatus is used in connection with a bottle 46a, the bottom of which constitutes the wall 45 against which the feet 44 rest. The tubular member 41 extends through a bearing member 47 in the bottom of the bottle so as to discharge the gases into the liquid contained in the bottle. If desired, a packing 48 may be disposed between the bearing 47 and the nut 43, the lower face of the nut 43 being provided with a reduced or sharpened portion 49 which contacts the washer 48 while the bearing 47 is provided with a reduced or sharpened edge 50 which also engages the washer 48 in opposition to the edges 49. While the present apparatus is disclosed for use in connection with a bottle, it is to be understood that the invention is not to be so limited, as the apparatus and the product derived therefrom may be employed for many other uses. Furthermore, the carbon dioxide is maintained under pressure by reason of its being confined and in such condition is adapted to be subjected to any desired or suitable use.

In order to reduce to a minimum the amount of carbon dioxide which would ordinarily escape from the charged liquid as it is dispensed, and to cause the maximum absorption of the carbon dioxide by the liquid, after the pressure is relieved, any suitable substance, either artificial or natural, may be employed to lower the surface tension of the liquid. This substance is introduced preferably by incorporating the same with the sodium bicarbonate at the time that the cartridge is produced, or the mixture prepared, if the sodium bicarbonate is to be employed in a free powdered form, with the result that when the chemical is heated to decompose the same, the active substance will be carried into the water by sublimation, distillation, or water vapor distillation, thereby lowering the surface tension of the water, and increasing the amount of carbon dioxide absorbed.

The same result may also be obtained by forming or providing holes or openings in the shell or envelope which encloses the sodium bicarbonate, so that some of the sodium bicarbonate will be carried with the stream of carbon dioxide gas and water vapor developed by the decomposition of the sodium bicarbonate, into the liquid to be charged.

This will be accomplished by reason of the fact that the sodium bicarbonate increases the solubility of carbon dioxide in the water.

What is claimed as new is:

1. An apparatus for producing carbon dioxide from substances which evolve dioxide upon heating, and on the place of consumption, said apparatus embodying a casing, an open chamber within the casing and out of communication therewith, a closure for the chamber, a heating unit within the chamber, means whereby said heating unit may be energized, said chamber receiving and holding the material to be heated, a passageway leading from said chamber, through said casing and out of communication therewith, said heating unit embodying a refractory member, a heating element adjacent the periphery thereof, the material to be treated being disposed in an enclosing shell, said shell being shaped to form a recess adapting it to be sleeved over the heating unit, there being vapor escape openings in the shell, and means for removably securing said unit in the said chamber.

2. An apparatus for producing carbon dioxide from substances which evolve dioxide upon heating and on the place of consumption, said apparatus embodying a casing, an open chamber within the casing and out of communication therewith, heat insulating material between the casing and chamber, a closure for the chamber, a heating unit within the chamber, means whereby said heating unit may be energized, said chamber receiving and holding the material to be heated, a passageway leading from said chamber, through said casing and out of communication therewith, said unit embodying a refractory body and heating elements adjacent the periphery thereof, an enclosing shell in which the material to be treated is disposed, said shell having outlet openings, said shell being of a concavo-convex shape to fit over said unit and being disposed between the unit and the wall of said chamber.

3. An apparatus of the character described embodying a closed casing provided with an opening through one wall, an open chamber extending into the casing through and substantially filling said opening, said chamber being of an external diameter considerably less than the internal diameter of the casing, a heating unit within the chamber and embodying a refractory body encompassed by and supporting a heating coil, anchoring means removably securing said unit to the base of said chamber, said unit being of a height considerably less than the depth of said chamber, a closure for the chamber, insulating material in the chamber between the said unit and said closure, means for connecting the ends of the heating coil to a source of supply of current, insulating material filling the space between said chamber and the casing wall, and an outlet pipe leading from said chamber through the last said insulating material and through the wall of said casing.

4. An apparatus of the character described embodying a closed casing provided with an opening through one wall, an open chamber extending into the casing through and substantially filling said opening, said chamber being of an external diameter considerably less than the internal diameter of the casing, a heating unit within the chamber and embodying a refractory body encompassed by and supporting a heating coil, anchoring means removably securing said unit to the base of said chamber, said unit being of a height considerably less than the depth of said chamber, a closure for the chamber, insulating material in the chamber between the said unit and said closure, means for connecting the ends of the heating coil to a source of supply of current, insulating material filling the space between said chamber and the casing wall, an outlet pipe leading from said chamber through the last said insulating material and through the wall of said casing, and means for anchoring said casing to a container, said container having an opening closed by said anchoring means and through which last said opening the said outlet pipe projects into said container.

5. An apparatus of the character described embodying a closed casing provided with an opening through one wall, an open chamber extending into the casing through and substantially filling said opening, said chamber being of an external diameter considerably less than the internal diameter of the casing, a heating unit within the chamber and embodying a refractory body encompassed by and supporting a heating coil, anchoring means removably securing said unit to the base of said chamber, said unit being of a height considerably less than the depth of said chamber, a closure for the chamber, insulating material in the chamber between the said unit and said closure, means for connecting the ends of the heating coil to a source of supply of current, insulating material filling the space between said chamber and the casing wall, an outlet pipe leading from said chamber through the last said insulating material and through the wall of said casing, said casing embodying two sections detachably secured together, and supporting feet for said casing.

6. An apparatus of the character described embodying a closed casing provided with an opening through one wall, an open chamber extending into the casing through and substantially filling said opening, said chamber being of an external diameter considerably less than the internal diameter of the casing, a heating unit within the chamber and embodying a refractory body encompassed by and supporting a heating coil, anchoring means removably securing said unit to the base of said chamber, said unit being of a height considerably less than the depth of said chamber, a closure for the chamber, insulating material in the chamber between the said unit and said closure, means for connecting the ends of the heating coil to a source of supply of current, insulating material filling the space between said chamber and the casing wall, an outlet pipe leading from said chamber through the last said insulating material and through the wall of said casing, and a shell of material to be treated, said shell being cup shaped and adapted to receive said heating unit.

7. An apparatus of the character described embodying a closed casing provided with an opening through one wall, an open chamber extending into the casing through and substantially filling said opening, said chamber being of an external diameter considerably less than the internal diameter of the casing, a heating unit within the chamber and embodying a refractory body encompassed by and supporting a heating coil, anchoring means removably securing said unit to the base of said chamber, said unit being of a height considerably less than the depth of said chamber, a closure for the chamber, insulating material in the chamber between the said unit and said closure, means for connecting the ends of the heating coil to a source of supply of current, insulating material filling the space between said chamber and the casing wall, an outlet pipe leading from said chamber through the last said insulating material and through the wall of said casing, and a shell of material to be treated, said shell being cup shaped and adapted to receive said heating unit, the said heating coil being disposed between the said refractory body and the said shell, said shell being provided with an apertured wall.

JOHANNES B. KESSEL.
FRITZ LESSING.